United States Patent [19]
Nielsen

[11] Patent Number: 6,052,158
[45] Date of Patent: Apr. 18, 2000

[54] USING EQUALIZED DATA FOR FILTER SELECTION IN HDTV RECEIVER

[75] Inventor: Larry E. Nielsen, Chicago, Ill.

[73] Assignee: Zenith Electronics Corporation, Glenview, Ill.

[21] Appl. No.: 09/066,123

[22] Filed: Apr. 24, 1998

[51] Int. Cl.[7] ................................. H04N 5/44; H04N 5/38
[52] U.S. Cl. ........................... 348/725; 348/21; 348/607; 348/609; 348/610; 375/229; 375/230; 375/241
[58] Field of Search .............................. 348/21, 607, 609, 348/610, 470; 375/229, 230, 241

[56] References Cited

U.S. PATENT DOCUMENTS

| | | | |
|---|---|---|---|
| 5,546,132 | 8/1996 | Kim et al. ................................. | 348/607 |
| 5,572,249 | 11/1996 | Ghosh ..................................... | 348/608 |
| 5,602,602 | 2/1997 | Hulyalkar ................................. | 348/607 |
| 5,731,848 | 3/1998 | Patel et al. .............................. | 348/614 |
| 5,793,417 | 8/1998 | Lee ........................................... | 348/21 |
| 5,886,748 | 3/1999 | Lee ......................................... | 348/614 |

*Primary Examiner*—Andrew I. Faile
*Assistant Examiner*—Paulos Natnael

[57] ABSTRACT

A digital television receiver includes a filter for minimizing NTSC interference with a received signal having a constant symbol rate. An equalizer has two one symbol delays for each tap. A filtered and a non-filtered version of the received signal are applied to a multiplexer at the input of the equalizer, which is operated at twice the symbol rate. The outputs of the multipliers in the equalizer are combined and applied to a demultiplexer. The filtered and non-filtered equalized signals are compared and a selection as to which of the filtered or non-filtered received signals is to be processed is made based upon the comparison.

10 Claims, 2 Drawing Sheets

USING EQUALIZED DATA FOR FILTER SELECTION IN HDTV RECEIVER

BACKGROUND OF THE INVENTION AND PRIOR ART

This invention relates generally to equalizer circuits and specifically to equalizer circuits that are used in High Definition Television (HDTV) receivers.

In the recently adopted digital advanced television systems standards, there will be a relatively long period when both NTSC and HDTV signals may be broadcast in the same service areas. The HDTV receivers will incorporate a filter, such as a comb filter, which cooperates with precoding in the transmitted signals for minimizing the effects of cochannel NTSC interference in the HDTV receivers. These circuits are well known in the prior art and have the disadvantage of reducing the signal-to-noise ratio of the received signal by about 3 dB. Consequently, unless there is a need to use the filter (i.e., there is significant NTSC signal interference), the filter is not desirable. Some form of decision making circuit is incorporated in the receiver to essentially compare errors with and without the filtering and to disable the filter if there is no substantial benefit.

The receiver also includes a signal equalizer for neutralizing certain types of interference, especially ghost signals. The equalizer includes a series of delays and corresponding multipliers through which the symbols of the received signal are passed. The coefficients of the multipliers are changed in accordance with the determined equalization of the received signal. These circuits and their operation are well known in the art. The prior art circuits make the determination as to whether to include the NTSC filter or not based upon unequalized signals. This has a disadvantage since intersymbol interference may be present in the received signals (due primarily to ghosting) and result in erroneous decisions. The present invention makes the decision based upon equalized data and therefore enables a better decision to be made regarding whether the filter should be included in processing the received signal.

OBJECTS OF THE INVENTION

A principal object of the invention is to provide a television receiver having improved NTSC interference rejection.

Another object of the invention is to provide an improved arrangement for determining whether to filter for NTSC interference.

A further object of the invention is to provide a novel equalizer for use in a television receiver having an NTSC interference rejection filter.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENT

Figure 1:
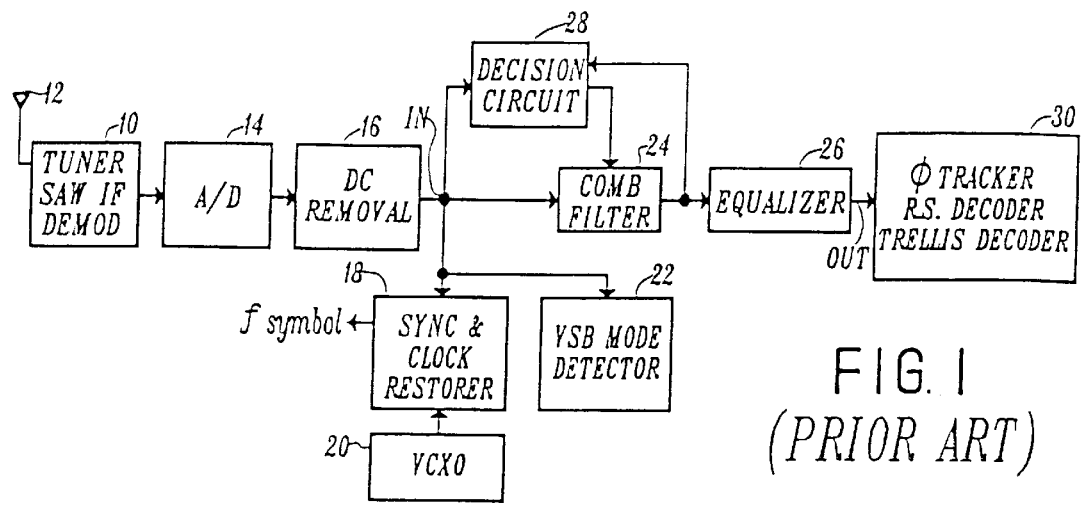
FIG. 1 is a simplified block diagram of a prior art television receiver having an NTSC interference filter in the form of a comb filter.

Referring now to FIG. 1, a prior art television receiver includes a tuner, saw IF and demodulator 10 that are supplied with terrestrial signals comprising a plurality of multilevel symbols received at a constant symbol rate via an antenna 12. The output of block 10 is supplied to an analog to digital converter 14, which in turn supplies a DC removal circuit 16. The output of the DC removal circuit supplies a sync and clock restorer circuit 18, a VSB mode detector circuit 22, a linear filter such as a comb filter 24 and a decision circuit 28. The junction of the above-mentioned circuits is labelled IN. A voltage controlled crystal oscillator 20 supplies oscillator signals to circuit 18, which develops a signal, $f_{sym}$ corresponding to rate of the received symbols and other timing signals needed in the receiver. It should be noted that in addition to $f_{sym}$ (which may also be referred to as $f_{clk}$), the circuit may readily develop a $2f_{clk}$ (twice symbol rate) signal as is used in some of the following circuits that incorporate the invention. Decision circuit 28, as discussed above, is also supplied with the comb filtered signal and determines whether the received signal will benefit from the use of the NTSC rejection filter or not. Decision circuit 28 may take the form of a comparator for comparing the filtered and unfiltered signals. The output is also supplied to an equalizer 26 of conventional construction and operation. The output of the equalizer is labelled OUT and is supplied to a block 30 that includes, among other circuits, a phase tracker, an R-S decoder, a trellis decoder, symbol decoders, etc. and video processing circuitry, all of which are well-known in the art. As mentioned, the information supplied to decision circuit 28 is obtained before equalizer 26 and is thus subject to signal impairments, such as intersymbol interference, that the equalizer can minimize. Consequently, NTSC interference filtering decisions are often made with less-than-optimum signals.

Figure 2:
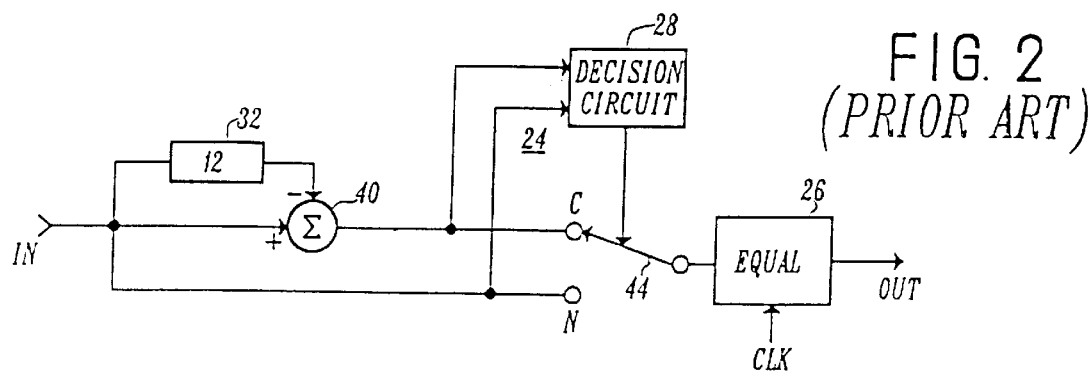
FIG. 2 is the equalizer and comb portion of the prior art diagram of FIG. 1.

FIG. 2 illustrates the comb filter and the equalizer in more detail. The received signal is applied to IN and passes through a 12 symbol delay circuit 32, to one input of a subtractor 40 and directly to another input of subtractor 40. The output of the subtractor comprises the comb filtered signal and is coupled to decision circuit 28, that may comprise a comparator, and to a terminal C (combed) of a switch 44. The received signal is also supplied, without combing, to decision circuit 28 and to a terminal N (non combed) of switch 44. The decision circuit 28 is also well known in the art and determines, for example, the input signal that has the least number of errors and operates switch 44 accordingly. The switch couples the selected one of the combed or non-combed received signals to equalizer 26 for further processing.

Figure 3:
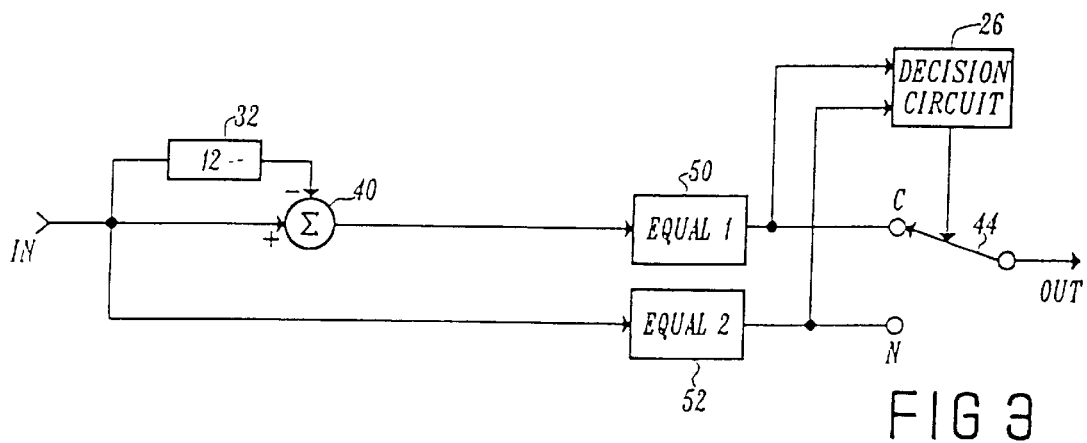
FIG. 3 is the same portion of FIG. 1 illustrating one aspect of the invention.

In FIG. 3, one aspect of the invention is shown. Here, the information supplied for determining whether to filter or not is taken after equalization. The filtered input signal is supplied to a first conventional equalizer 50, the output of which supplies terminal C of switch 44 and decision circuit 28. Similarly, the non filtered input signal is supplied to a second conventional equalizer 52, the output of which supplies terminal N of switch 44 and decision circuit 28. Here, the decision on whether to filter or not is made on data that has been equalized and which therefore optimizes the opportunity for making a correct decision.

Figure 4:
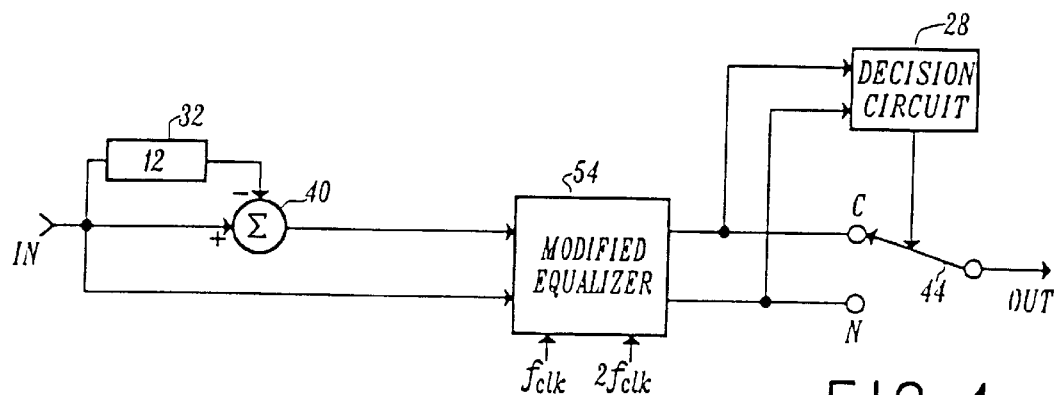
FIG. 4 is a block diagram of the equalizer and comb portion showing another aspect of the invention.

FIG. 4 illustrates another aspect of the invention that utilizes a modified equalizer 54 that is operated at a $2f_{clk}$ rate, that is at twice the input signal symbol rate. The outputs of the modified equalizer 54 are supplied to decision circuit 28 and to the C and N terminals of switch 44. Thus the filtered equalized signal appears at terminal C and the non-filtered equalized signal appears at terminal N. Here again, the decision circuit 28 makes decisions based upon equalized data.

Figure 5:
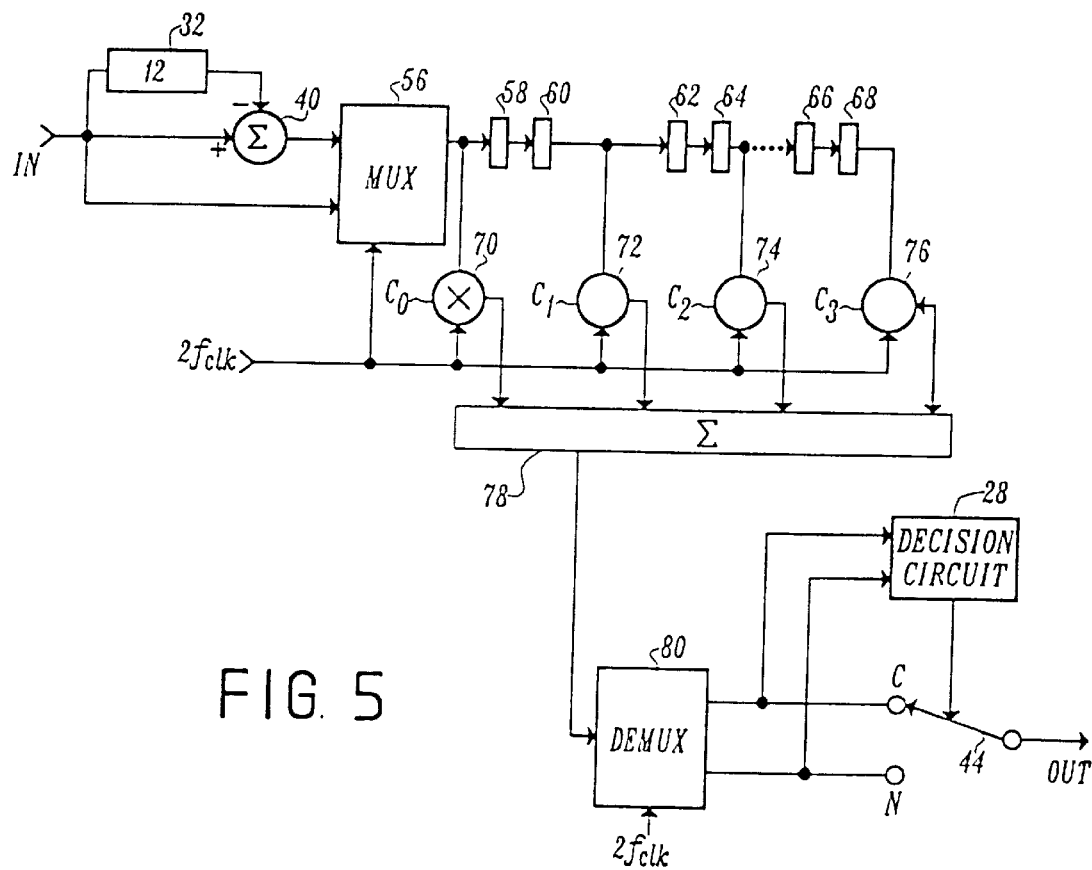
FIG. 5 is a more detailed depiction of FIG. 4.

FIG. 5 shows the modified equalizer circuit of FIG. 4 in more detail. Specifically, the filtered input signal is applied to one input of a multiplexer 56 and the non-filtered input signal is applied to the other input of multiplexer 56. The output of multiplexer 56 is supplied to a series of pairs of one-symbol delays comprising D type flip-flops 58,60; 62,64; and 66,68. It will be appreciated that there may be thirty-two, sixty-four or a greater number of pairs of flip-flops, depending upon the precision of the equalizer desired. As in a conventional equalizer, each pair of one symbol delays is coupled to a multiplier, for example, multipliers 70, 72, 74 and 76, the outputs of which are supplied to an adder 78. The multipliers are supplied with coefficients $c_0$, $c_1$, $c_2$, $-c_n$ from well-known circuitry (not shown) for equalizing the signal. The multiplexer 56, the D flip flops 58–68 and the multipliers 70–76 are driven at a $2f_{clk}$ rate, i.e., at twice the symbol rate. Consequently, the filtered and non filtered signals will be alternately processed by the equalizer, each at the rate $f_{clk}$. A demultiplexer 80 is connected to the output of adder 78 and operates at twice the symbol rate to separate the multiplexed output of adder 78 into a filtered equalized signal for application to terminal C and decision circuit 28 and a non filtered equalized signal for application to terminal N and decision circuit 28.

What has been described is a novel circuit arrangement for improving the decision of whether to include an NTSC interference rejection filter in a television receiver or not. Unlike prior art circuits, the circuits of the invention supply equalized data, which enables more optimum conditions for decision making. It is recognized that numerous changes to the described embodiment of the invention will be apparent without departing from its true spirit and scope. The invention is to be limited only as defined in the claims.

What is claimed is:

1. A method of operating a digital television receiver, having a filter for reducing the effects of NTSC interference on a received signal having a constant symbol rate, comprising:
   developing filtered and non-filtered received signals;
   equalizing the filtered and non-filtered received signals;
   comparing the filtered and non filtered equalized received signals; and
   selecting one of the received signals for processing based upon the comparing step.

2. The method of claim 1, further comprising:
   providing a pair of equalizers; and
   applying the filtered and non-filtered received signals to the pair of equalizers.

3. The method of claim 1, further comprising:
   providing an equalizer having a two-symbol delay for each tap;
   operating the equalizer at twice the symbol rate;
   applying the filtered and non filtered received signals to the equalizer; and
   comparing the outputs of the equalizer to generate the filtered and non-filtered equalized signals.

4. The method of claim 3, wherein said applying step comprises multiplexing the filtered and non filtered received signals for application to the equalizer and further comprising:
   demultiplexing the outputs of the equalizer prior to the comparing step.

5. A method of operating a digital television receiver, having a filter for reducing NTSC interference with a received signal having a constant symbol rate, comprising:
   developing filtered and non-filtered received signals;
   providing an equalizer having a two-symbol delay for each tap;
   operating the equalizer at twice the symbol rate;
   multiplexing and applying the filtered and non-filtered received signals to the equalizer;
   demultiplexing the output of the equalizer to develop equalized filtered and non-filtered signals;
   comparing the filtered and non filtered equalized signals; and
   selecting the desired one of the filtered and non-filtered received signals for processing based upon the comparing step.

6. A digital high definition television receiver for receiving a signal having a constant symbol rate signal comprising:
   filter means for reducing the effects of NTSC interference on said received signal;
   means for supplying said received signal to said filter means for developing filtered and non filtered signals;
   means for equalizing said filtered and non-filtered signals;
   means for comparing said filtered and non filtered equalized signals; and
   means for selecting one of said filtered and non-filtered equalized signals for processing based upon said comparison.

7. The television receiver of claim 6, wherein said equalizing means comprises a pair of equalizers.

8. The television receiver of claim 6, wherein said equalizing means comprises:
   an equalizer having a plurality of taps, a corresponding plurality of multipliers and two one symbol delays for each of said plurality of taps;
   means for operating said equalizer at twice the symbol rate;
   multiplexing means for applying said filtered and non filtered signals to said equalizer; and
   means for demultiplexing the output of said equalizer for developing said filtered and non-filtered equalized signals.

9. The television receiver of claim 8, wherein said equalizer includes a pair of flip flop delays for each of said plurality of taps and further including:
   means for operating said multipliers at twice said symbol rate; and
   means for supplying the outputs of said multipliers to said demultiplexing means.

10. A digital high definition television receiver for receiving a signal having a constant symbol rate signal comprising:
   filter means for reducing the effects of NTSC interference on said received signal;
   means for supplying said received signal to said filter means for developing filtered and non filtered signals;
   equalizing means comprising an equalizer having a plurality of taps, a corresponding plurality of multipliers and two one symbol delays for each of said plurality of taps;
   means for operating said equalizer at twice the symbol rate;
   multiplexing means for applying said filtered and non-filtered signals to said equalizer;
   means for demultiplexing the output of said equalizer for developing filtered and non-filtered equalized signals;
   means for comparing said filtered and non filtered equalized signals; and
   means for selecting one of said filtered and non-filtered equalized signals for processing based upon said comparison.

* * * * *